US008033531B2

(12) United States Patent
Beckmann et al.

(10) Patent No.: US 8,033,531 B2
(45) Date of Patent: Oct. 11, 2011

(54) APPARATUS FOR MIXING A FLUID WITH A LARGE GAS STREAM, ESPECIALLY FOR INTRODUCING A REDUCING AGENT INTO A FLUE GAS CONTAINING NITROGEN OXIDES

(75) Inventors: Gerd Beckmann, Gummersbach (DE); Ulrich Priesmeier, Gummersbach (DE)

(73) Assignee: Fisia Babcock Environment GmbH (DE)

( * ) Notice: Subject to any disclaimer, the term of this patent is extended or adjusted under 35 U.S.C. 154(b) by 465 days.

(21) Appl. No.: 12/097,435

(22) PCT Filed: Dec. 14, 2006

(86) PCT No.: PCT/EP2006/012087

§ 371 (c)(1), (2), (4) Date: Jun. 13, 2008

(87) PCT Pub. No.: WO2007/073881

PCT Pub. Date: Jul. 5, 2007

(65) Prior Publication Data

US 2008/0308955 A1 Dec. 18, 2008

(30) Foreign Application Priority Data

Dec. 15, 2005 (DE) ......................... 10 2005 059 971

(51) Int. Cl.
*B01F 3/04* (2006.01)

(52) U.S. Cl. ....... 261/78.2; 239/461; 261/111; 261/115; 422/228

(58) Field of Classification Search ................. 261/78.1, 261/78.2, 111, 115–118, DIG. 9; 239/338, 239/461; 422/168, 228
See application file for complete search history.

(56) References Cited

U.S. PATENT DOCUMENTS 2,937,013 A * 5/1960 Fisher ............................. 261/17
3,317,197 A * 5/1967 Lohner et al. ................... 261/24
(Continued)

FOREIGN PATENT DOCUMENTS

DE 1 071 604 12/1959
(Continued)

OTHER PUBLICATIONS

Führer durch die Strömungslehre, Fig. 4.41, 1990.

*Primary Examiner* — Richard L Chiesa
(74) *Attorney, Agent, or Firm* — Robert Becker; Robert Becker & Associates

(57) ABSTRACT

An apparatus for mixing a liquid with a large gas stream flowing in a gas duct, especially for introducing reducing agent into flue gas containing nitrogen oxides. At least one metering lance having at least two atomizer nozzles supplies liquid to the gas stream, with the nozzles being inclined relative to the direction of flow of the gas stream and being inclined in opposite directions relative to one another. At least one disk-shaped mixer element is associated with and spaced from the nozzles, and is inclined relative to the direction of flow of the gas stream. Flow eddies form at the mixer element, and at least a portion of the liquid enters the flow eddies. Atomization is effected in such a way by the mixer element that volatilized gaseous portions in the nozzle streams exiting the nozzles enter the flow eddies, while non-volatized droplet portions, due to their inertia and an atomizer angle, do not enter the flow eddies in the vicinity of the mixer element.

10 Claims, 3 Drawing Sheets

U.S. PATENT DOCUMENTS

| | | | | | |
|---|---|---|---|---|---|
| 3,957,465 | A | * | 5/1976 | Pircon | 95/221 |
| 3,958,961 | A | * | 5/1976 | Bakke | 96/47 |
| 4,070,424 | A | * | 1/1978 | Olson et al. | 261/142 |
| 4,358,433 | A | * | 11/1982 | Pircon | 423/659 |
| 4,498,786 | A | | 2/1985 | Ruscheweyh | |
| 4,744,958 | A | * | 5/1988 | Pircon | 422/606 |
| RE34,586 | E | | 4/1994 | Spink et al. | |
| 5,547,540 | A | | 8/1996 | Ruscheweyh | |
| 6,382,600 | B1 | * | 5/2002 | Mahr | 261/78.2 |
| 7,063,817 | B2 | | 6/2006 | Sigling | |
| 2003/0013931 | A1 | | 1/2003 | Block et al. | |
| 2006/0158961 | A1 | | 7/2006 | Ruscheweyh et al. | |

FOREIGN PATENT DOCUMENTS

| | | |
|---|---|---|
| DE | 37 23 618 | 1/1988 |
| DE | 269101 | 6/1989 |
| DE | 277215 | 3/1990 |
| DE | 434908 | 6/1995 |
| EP | 0 637 726 | 2/1995 |
| GB | 1194203 | 6/1970 |

* cited by examiner

APPARATUS FOR MIXING A FLUID WITH A LARGE GAS STREAM, ESPECIALLY FOR INTRODUCING A REDUCING AGENT INTO A FLUE GAS CONTAINING NITROGEN OXIDES

BACKGROUND OF THE INVENTION

The instant application should be granted the priority dates of Dec. 15, 2005, the filing date of the corresponding German patent application 10 2005 059 971.0, as well as Dec. 14, 2006, the filing date of the International patent application PCT/EP2006/012087.

The present invention relates to an apparatus for mixing a fluid with a large volume gas stream (principal stream) flowing in a gas duct, especially for introducing a reducing agent into a flue gas that contains nitrogen oxides, the apparatus having at least one nozzle or metering lance having at least one nozzle for the supply of the fluid, the axis of which forms an angle with the direction of flow of the gas stream, and having at least one flat mixer element that is associated at a distance with the nozzle and that forms an angle with the direction of flow of the gas stream, whereby flow eddies form at the mixer elements and at least a portion of the fluid passes or enters into these flow eddies.

Such an apparatus is known from DE 37 23 618 C1, whereby the reducing agent is introduced in a gaseous state into the large gas stream (flue gas). The static mixer element is used to shorten the fundamentally very long mixing paths.

With SCR units, to reduce the $NO_x$ level (Selective Catalytic Reduction) of flue gases, for example of power plant furnaces, by means of reducing agent and catalyzer, it is customary, where the reducing agent is $NH_3$, that it is stored in the form of pressure-condensed $NH_3$ or of ammonium hydroxide ($NH_4OH$), and pre-vaporized $NH_3$ is sprayed into the flue gas stream via a carrier gas stream and is mixed with the flue gas stream. Where the reducing agent is urea, first an aqueous urea solution is produced that, after suitable processing, is then sprayed into the flue gas stream in gaseous form.

With the known apparatus, the mixer element is a square or rectangular plate that extends over the width of the flue gas duct. The metering lance with the nozzle is disposed essentially laterally of and parallel to that edge of the mixer plate that is disposed upstream relative to the direction of flow of the flue gas stream, and the nozzle stream of the gaseous reduction agent, in the form of $NH_3$-carrier gas mixture, is sprayed laterally upon the back side of the mixer element. The distribution into the flow eddies is effected directly at and behind the mixer plate and, due to the increased turbulence in the flue gas flow, downstream of the mixer plate. With a large duct cross-section, metering lances are disposed next to one another to fill the cross-section, as well as a plurality of flow plates associated with the metering lances, are provided.

Also proposed has been an introduction of ammonium hydroxide (liquid $NH_4OH$) or urea solution without pre-vaporization directly into the flue gas stream on the back side of a mixer element, whereby the nozzle is arranged on the back side (lee side) of the mixer element in such a way that the direction of introduction extends parallel to the gas stream of the flue gas. The nozzle stream is composed of a mixture of gas and liquid droplets that after a certain period of time are volatilized in the warm environment, which is at approximately 300° C. In this connection there is the danger that reducing agent droplets, together with dust particles contained in the flue gases, lead to concrete-like deposit formation on the mixer element or elements that are used, on support elements for the mixer elements, and possibly on the walls of the flue gas duct. The nozzles must therefore be disposed far enough from the mixer elements that non volatized droplets cannot strike the mixer elements, even under the influence of backflows (eddy trains). This leads to a lengthening of the flue gas duct length that is free of installed components, and which is necessary for the thorough mixing. Additional static mixer elements cannot be installed in the flue gas stream downstream of the metering-in due to the danger of the formation of deposits.

It is an object of the present invention to improve the apparatus of the aforementioned general type in such a way that with a direct metering-in of a liquid as the fluid, in particular liquid reducing agent, with a short mixing path a formation of deposits is prevented to a substantial extent.

SUMMARY OF THE INVENTION

With an apparatus of the aforementioned general type, this object is realized in that if the fluid is a liquid, the metering lance is provided with at least two atomizer nozzles which are inclined relative to the direction of flow of the gas stream and are inclined in opposite directions relative to one another, in that the atomizer nozzles are associated with a disk-like mixer element, and in that the atomization is effected in such a way that the volatilized gaseous portions contained in the nozzle stream respectively exiting the atomizer nozzles enters the flow eddies, while the non-volatilized droplet portions, due to their inertia and the atomizer angle, do not enter the flow eddies in the vicinity of the mixer disk.

The atomizer nozzles can, relative to the gas stream, be disposed downstream or upstream of the mixer disk.

Both embodiments ensure that large, non-volatilized drops largely follow the original jet or stream axis due to their inertia, and do not strike the mixer disk, which could lead to the formation of deposits there, while the $NH_3$ volatilized in the hot flue gas from the supplied liquid reducing agent of the flue gas stream follows and is bound or incorporated as gas into the eddy wakes that form directly behind the mixer disk. In this way, even with the direct metering-in of $NH_4OH$, preliminary distribution is achieved.

The mixer disk preferably has a circular, elliptical, oval, parabola, diamond, or triangular shape, as is known from DE 37 23 618 C1, column 2, lines 40-45.

It is expedient for the angle between the two atomizer nozzles to be in the range of between 60° and 120°, preferably 90°.

The mixer disk is preferably inclined at an angle relative to the direction of flow of the gas stream in the range of between 30° to 90°.

It is expedient for the atomizer nozzles to be 2-material nozzles having an auxiliary atomization medium, preferably with compressed air or water vapor as the auxiliary atomization agent. With 2-material nozzles, a fine droplet spectrum can be generated.

However, pressure nozzles without auxiliary medium can also be used.

To prevent droplet drips at the nozzle outlets, the atomizer nozzles can be provided with blocking or screening air.

To further optimize the orientation of the droplet trajectories, the plane defined by the nozzle streams of the atomizer nozzles is inclined at an angle relative to the direction of flow of the gas stream in the range of from 0° to 30°.

BRIEF DESCRIPTION OF THE DRAWINGS

The invention will be explained in greater detail subsequently by way of example and with the aid of the figures, in which.

DESCRIPTION OF PREFERRED EMBODIMENTS

The formation of eddy trails or wakes involves a natural phenomenon in three-dimensional flows at a body (See Prandtl, Oswatitsch, Wieghardt; GUIDE THROUGH FLUID DYNAMICS, $9^{TH}$ Edition 1990; ISBN 3-528-28209-6, page 229, FIG. 4.41 and pertaining text).

Figure 3:
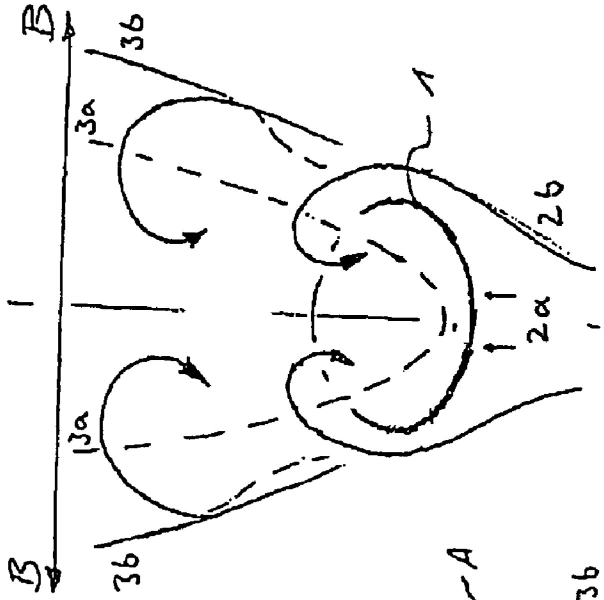
FIG. 3 is a front view onto the lee side of the disk transverse to the line B-B in the illustration of FIG. 1.
Figure 1:
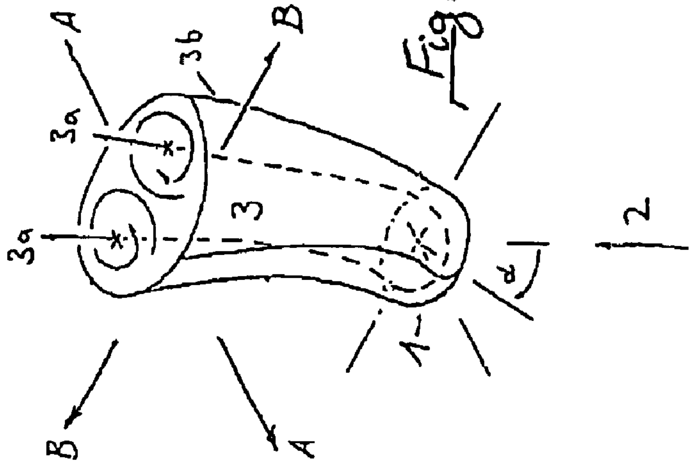
FIG. 1 shows a three-dimensional representation of a horseshoe eddy with eddy wake obtained at a circular disk against which a gas stream flows and that is inclined relative to the stream at an angle α.
Figure 2:
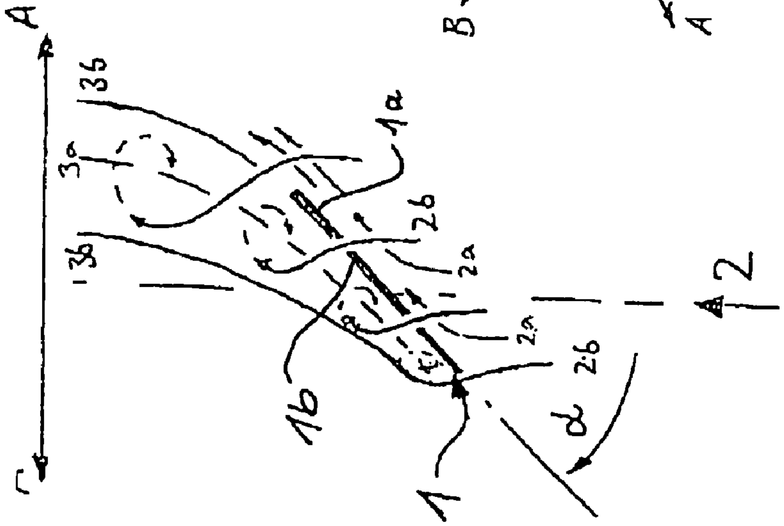
FIG. 2 is a side view transverse to the line A-A in FIG. 1.

The formation, the shape and position of such eddy wakes in the downflow of mixer disks are first schematically illustrated in FIGS. 1-3 and will be described in conjunction therewith.

A circular disk 1 is inclined at an angle α relative to the flowing gas stream 2, which in FIG. 1 comes from below. On the windward side la of the disk, the gas stream is deflected from its main direction of flow, and there results a high-pressure zone. The partial stream 2*a* of the gas stream 2 flows at a prescribed angle along and below the disk. On the lee side 1*b* of the disk, a low-pressure zone forms that is filled beyond the edge of the disk by the partial stream 2*a* of the gas stream 2. Due to the flow deflection at the edge of the disk, there is formed a horseshoe eddy 3 having the eddy axis 3*a*, which is shown by a dashed line and that continues downstream of the disk in the form of an eddy wake having two symmetrically rotating eddies or whirls. The lateral eddies of the horseshoe eddy continue as wakes, overlap or superpose with the gas stream (principal stream), and expand with the principal stream. The flow condition within the eddy wake is very turbulent. The schematically illustrated boundary 3*b* of the horseshoe eddy and wake should not be seen as a sharply defined demarcation. The position and the structure of the two eddies as well as the opposite directions of rotation thereof, can be experimentally determined with suitable measuring techniques.

Comparable eddies having wakes form with other disk shapes, such as elliptical, oval, parabola, diamond or triangular shapes.

The turbulent inter mixing of eddy wakes and gas stream is utilized to uniformly distribute a gas stream that is metered-in in a nearly point-type manner over a very large cross-sectional area.

Figure 5:
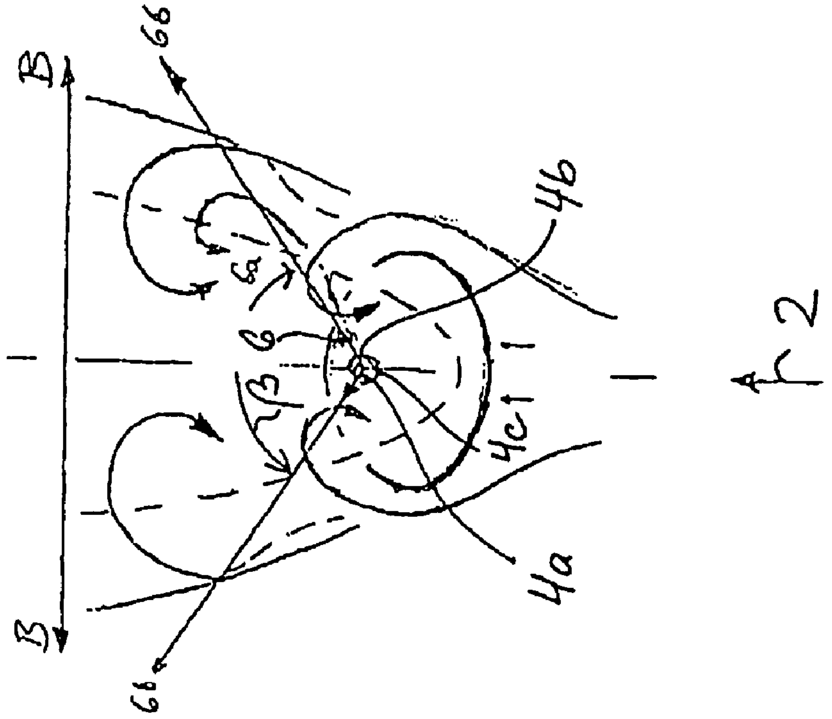
FIG. 5 is a rear view onto the windward side of the disk transverse to the line B-B in the illustration of FIG. 1.
Figure 4:
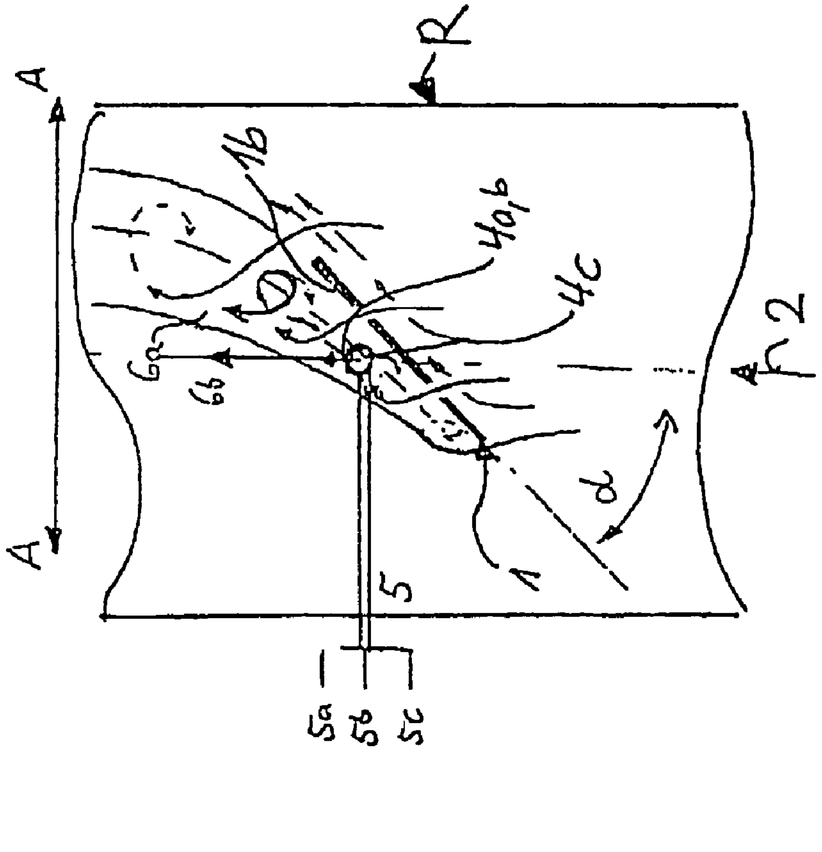
FIG. 4 is a side view comparable to FIG. 2 with a first embodiment of the inventive apparatus, according to which the atomizer nozzles, relative to the gas stream, are disposed downstream of the mixer disk, whereby the cross-section of the gas duct that conveys the gas stream is also illustrated.

With the embodiment of the inventive apparatus shown in FIGS. 4 and 5, two atomizer nozzles 4*a* and 4*b* are disposed on the head 4*c* of a metering lance 5 that extends into a flue gas duct R. (More than two atomizer nozzles can be used; it is also possible to use pressure nozzles). The atomizer nozzles are disposed on the lee side 1*b* of the preferably circular mixer disk 1 and at a predetermined distance from it. The nozzle stream, which respectively exits from one of the nozzle 4*a* and 4*b*, contains gaseous constituents 6*a* and non volatilized droplets 6*b*. The two atomizer nozzles 4*a* and 4*b* form an angle β of 120°, and are inclined relative to the principal stream. Other angles are possible. The range is preferably between 60° and 120°.

The plane defined by the nozzles 4*a* and 4*b* is not inclined relative to the principal stream.

In FIGS. 4 and 5, the liquid reaction agent 5*a* is atomized by means of an auxiliary atomization medium 5*c*, and the nozzle stream 6 is surrounded by blocking or screening air 5*c*.

In FIGS. 4-7, schematically illustrated in addition to the partial streams 2*a* and 2*b* are the streams 6*a* (gaseous constituent of the nozzle stream 6) and 6*b* (non volatilized droplets) of the meter-in stream 6. The vaporized or volatilized portion 6*a* of the meter-in stream—as illustrated in the figures—follows the curvatures of the principal stream and is rolled into the eddy stream 3. The non volatilized droplets 6*b* track their inertia below the selected metering-in angle β and thus, on the lee side 1*b* of the disk 1, pass through the eddy returning on the lee side, so that a deposition of droplets and fine dust from the flue gas is essentially prevented.

The droplets of the partial stream 6*b* later volatilize in the flue gas stream, and are mixed in to an adequate extent by the turbulence that is present there.

The partial stream 6*a* can also still contain very fine droplets which, however, rapidly volatilize and therefore, if at all, contribute only slightly to the formation of deposits. Relative to the quantity of the reducing agent, the partial stream 6*a* contains significantly more reducing agent than does the partial stream 6*b*. Where there is no passing through of the eddy train as taught by the present invention, the smaller partial stream 6*b* would, however, lead to a significant formation of deposits.

Figure 7:
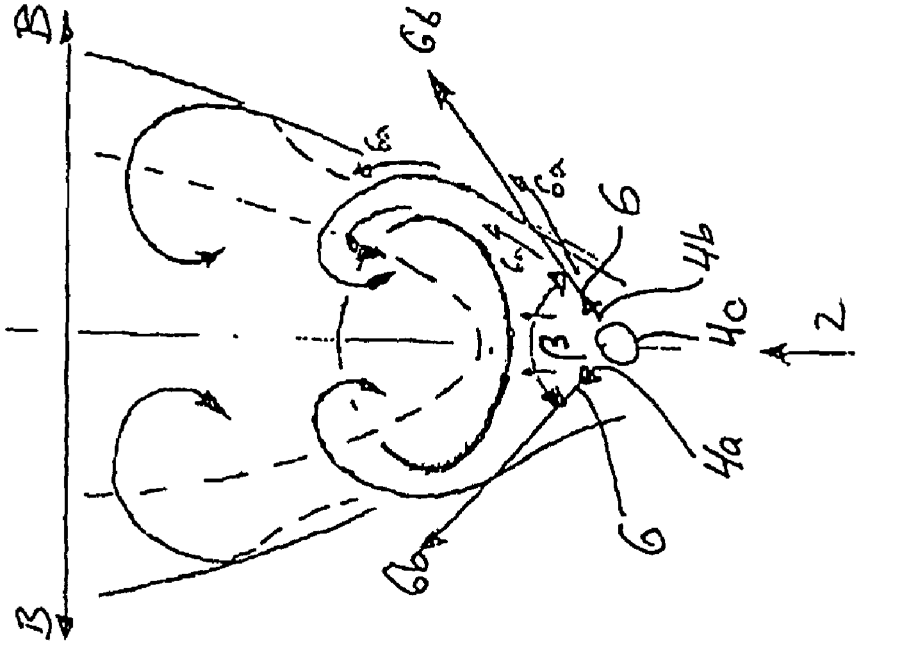
FIG. 7 is a front view onto the lee side of the disk transverse to the line B-B in the illustration of FIG. 1.
Figure 6:
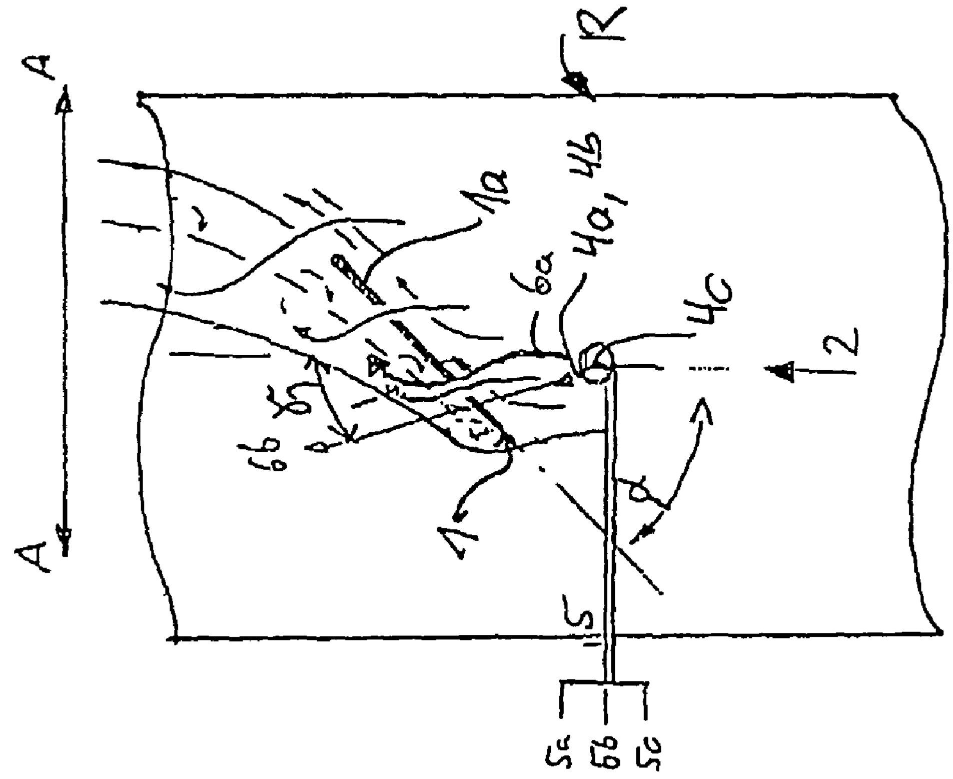
FIG. 6 is a side view comparable to FIG. 4 with a second embodiment of the inventive apparatus, according to which the atomizer nozzles, relative to the gas stream, are disposed upstream of the mixer disk.

With the embodiment illustrated in FIGS. 6 and 7, the nozzle head with the atomizer nozzles 4*a* and 4*b* is disposed upstream of the mixer disk 1. The atomizer nozzles 4*a* and 4*b* are arranged in such a way that the axis of the nozzle streams 6 extend on both sides at an adequate spacing next to the mixer disk 1. The spacing relative to the disk can preferably be about 0.5 m. Also with this embodiment the droplet trajectories 6*b* pass through the eddies directed toward the mixer disk.

With the embodiment of FIGS. 6 and 7, the plane that is defined by the nozzles 4*a* and 4*b* is inclined relative to the principal stream by the angle γ=20°.

With this embodiment, and with the embodiment of FIGS. 4-5, an angle of inclination γ in the range of 0° to 30° is possible.

With the embodiment of FIGS. 6 and 7, it is advantageous for the space upstream of the mixer disk 1, which is often not used for technical reasons, to be used for the arrangement of the nozzle or metering lance 5. In addition, with the embodiment there exists the freedom to guide the metering lance 5, independently of the inclination of the mixer disk 1 relative to the principal stream, from the wall of the duct R in any desired direction toward the location of metering or introduction, without thereby having to execute in a conventional manner a very complicated and expensive passing through of the mixer disk 1.

It is to be understood that with large duct cross-sections a plurality of mixer disks having atomizer nozzles associated therewith can be distributed over the duct cross-section. More than two nozzles, for example in a porcupine arrangement, can also be associated with a mixer disk. They need only be arranged in such a way that the droplet trajectories pass through the eddy.

The specification incorporates by reference the disclosure of German 10 2005 059 971.0 filed Dec. 15, 2005, as well as International application PCT/EP2006/012087, filed Dec. 14, 2006.

The present invention is, of course, in no way restricted to the specific disclosure of the specification and drawing, but also encompasses any modifications within the scope of the appended claims.

REFERENCE NUMERAL LIST

1 disk (mixer disk)
1*a* windward side of the disk
1*b* lee side of the disk
2 gas stream
2*a* gas stream, partial stream on the lee side 1*a* of the disk
2*b* gas stream, partial stream toward the lee side 1*b* of the disk
3 horseshoe eddy and wake
3*a* eddy axis
3*b* outer boundary of the eddy
4 5 metering lance
4*a* atomizer nozzle
4*b* atomizer nozzle
4*c* nozzle head
5*a* liquid reducing agent feed
5*b* gaseous auxiliary atomization medium feed
5*c* blocking or screening air feed
5 nozzle stream
6*a* gaseous portion
6*b* non volatilized droplets
R flue gas duct

The invention claimed is:

1. An apparatus for mixing a liquid with a large gas stream flowing in a gas duct, comprising:

at least one metering lance having at least two atomizer nozzles for supplying the liquid to the gas stream, wherein an axis of each of said at least two nozzles is disposed at an angle relative to a direction of flow of the gas stream, and wherein said atomizer nozzles are inclined in opposite directions relative to one another to form an atomizer angle; and at least one disk-shaped mixer element associated with and spaced relative to said at least two atomizer nozzles, wherein said mixer element is disposed at an angle relative to the direction of flow of the gas stream , further wherein flow eddies are adapted to form at said at least one mixer element, further wherein at least a portion of the liquid is adapted to enter the flow eddies, further wherein atomization is effected in such a way that volatilized gaseous portions contained in nozzle streams respectively exiting said atomizer nozzles enter said flow eddies, while non-volatilized droplet portions, due to their inertia and said atomizer angle, do not enter said flow eddies in the vicinity of said at least one mixer element, wherein said atomizer nozzles, relative to said gas stream, are disposed downstream or upstream of said at least one mixer element.

2. An apparatus according to claim 1, which is adapted to introduce a reducing agent into a flue gas that contains nitrogen oxides.

3. An apparatus according to claim 1, wherein said at least one mixer element has a circular, elliptical, oval, parabola, diamond, or triangular configuration.

4. An apparatus according to claim 1, wherein said atomizer angle between said atomizer nozzles is in the range of between 60° and 120°.

5. An apparatus according to claim 4, wherein said atomizer angle is approximately 90°.

6. An apparatus according to claim 1, wherein said at least one mixer element is disposed relative to the direction of flow of the gas stream at an angle that is in the range of between 30° to 90°.

7. An apparatus according to claim 1, wherein said atomizer nozzles are 2-material nozzles that are adapted to be supplied with auxiliary atomization medium.

8. An apparatus according to claim 1, wherein said atomizer nozzles are pressure nozzles.

9. An apparatus according to claim 1, wherein said atomizer nozzles are adapted to receive blocking or screening air.

10. An apparatus according to claim 1, wherein a plane defined by nozzle streams of said atomizer nozzles is inclined relative to the direction of flow of the gas stream at an angle that is in the range of 0° to 30°

* * * * *